(12) United States Patent
Schumann et al.

(10) Patent No.: US 6,681,910 B1
(45) Date of Patent: Jan. 27, 2004

(54) DRIVE WHICH ACTS ON BOTH SIDES AND FOR USE IN ADJUSTING DEVICES IN MOTOR VEHICLES

(75) Inventors: Peter Schumann, Untersiemau (DE); Georg Scheck, Weitramsdorf (DE)

(73) Assignee: Brose Fahrzeugteile GmbH & Co.KG Coburg, Coburg (DE)

( * ) Notice: Subject to any disclaimer, the term of this patent is extended or adjusted under 35 U.S.C. 154(b) by 0 days.

(21) Appl. No.: 10/111,123
(22) PCT Filed: Oct. 18, 2000
(86) PCT No.: PCT/DE00/03773
§ 371 (c)(1), (2), (4) Date: Jul. 23, 2002
(87) PCT Pub. No.: WO01/28808
PCT Pub. Date: Apr. 26, 2001

(30) Foreign Application Priority Data

Oct. 21, 1999 (DE) ............................. 199 52 633

(51) Int. Cl.[7] ..................... F16D 11/00; B60N 2/44
(52) U.S. Cl. .................. 192/71; 192/74; 192/95; 297/361.1
(58) Field of Search .................. 192/15, 39, 46, 192/74, 75, 71, 43, 43.1, 19; 297/361.1, 367; 74/576, 577 SF, 535

(56) References Cited

U.S. PATENT DOCUMENTS

| 2,746,331 A | 5/1956 | Anderson |
| 2,995,226 A | 8/1961 | Gilder |
| 3,008,765 A | 11/1961 | Tischler et al. |
| 3,204,133 A | 8/1965 | Tschudin |
| 3,817,110 A | 6/1974 | Challandes |
| 3,876,848 A | 4/1975 | Hartmann |
| 4,588,140 A * | 5/1986 | Hirano ................ 74/576 |
| 5,572,908 A * | 11/1996 | Bruder ............... 74/577 R |
| 5,611,747 A | 3/1997 | Bauer et al. |
| 5,692,589 A | 12/1997 | Beguin |
| 5,755,491 A | 5/1998 | Baloche et al. |
| 5,794,479 A | 8/1998 | Schwarzbich |
| 5,865,285 A | 2/1999 | Minkenberg et al. |

(List continued on next page.)

FOREIGN PATENT DOCUMENTS

| CH | 533 785 | 2/1973 |
| DE | 39 14 056 C 1 | 8/1990 |

(List continued on next page.)

OTHER PUBLICATIONS

English translation of International Preliminary Examination Report for International Application No. PCT/DE00/03773.
International Search Report of PCT/DE00/03773, dated Feb. 22, 2001.
International Preliminary Examination Report of PCT/DE00/03773, dated Aug. 24, 2001.

*Primary Examiner*—Rodney H. Bonick
*Assistant Examiner*—Eric M. Williams
(74) *Attorney, Agent, or Firm*—Christie, Parker & Hale, LLP

(57) ABSTRACT

A drive which operates on both sides for use in adjusting devices, such as motor vehicle seats, includes a drive lever, a drive wheel, and coupling elements. The pivotally mounted drive lever is for, starting from an initial position, effecting a turning movement in one direction or the other as desired. The drive wheel is turned when the drive lever is moved out of the initial position. The coupling elements are arranged on the drive lever and have coupling areas for transmitting a turning movement onto the drive wheel. In order to transmit a turning movement, the coupling element can be coupled to the drive wheel via at least one positive locking element and by at least one elastic element.

17 Claims, 10 Drawing Sheets

U.S. PATENT DOCUMENTS

| | | | |
|---|---|---|---|
| 5,881,854 A | | 3/1999 | Rougnon-Glasson |
| 5,918,714 A | | 7/1999 | Kadereit |
| 5,942,160 A | * | 8/1999 | Araki .................. 261/44.8 |
| 6,253,894 B1 | | 7/2001 | Schumann et al. |
| 6,283,886 B1 | | 9/2001 | Schumann |
| 6,543,598 B1 | * | 4/2003 | Schumann .................. 192/19 |
| 6,575,278 B1 | * | 6/2003 | Schumann et al. ........... 192/19 |

FOREIGN PATENT DOCUMENTS

| | | |
|---|---|---|
| DE | 41 20 617 A 1 | 12/1992 |
| DE | 44 37 073 A 1 | 1/1996 |
| DE | 195 27 912 A1 | 8/1996 |
| DE | 195 27 912 C 2 | 8/1996 |
| DE | 195 184 24 A 1 | 11/1996 |
| DE | 195 40 631 A 1 | 5/1997 |
| DE | 197 02 123 A 1 | 10/1997 |
| DE | 197 26 257 A 1 | 1/1998 |
| DE | 196 53 722 A 1 | 7/1998 |
| DE | 197 25 899 A1 | 12/1998 |
| DE | 197 25 899 A 1 | 12/1998 |
| DE | 197 34 536 A 1 | 2/1999 |
| EP | 0 450 324 A 2 | 10/1991 |
| EP | 0 754 589 A 2 | 1/1997 |
| JP | 5 176819 | 7/1993 |
| WO | WO 98/57819 * 6/1998 | ............ B60N/2/44 |

* cited by examiner

DRIVE WHICH ACTS ON BOTH SIDES AND FOR USE IN ADJUSTING DEVICES IN MOTOR VEHICLES

CROSS-REFERENCE TO RELATED APPLICATION

This application claims priority of International application number PCT/DE00/03773, filed Oct. 18, 2000, which in turn claims priority of German application number 199 52 633.8, filed Oct. 21, 1999.

FIELD OF THE INVENTION

The invention relates to a drive which acts on both sides and for use in adjusting devices in motor vehicles. Thee invention is provided in particular for adjusting vehicle A seats or components such as back rests and seat cushions.

BACKGROUND

From DE 197 25 899 A1 a drive acting on both sides is known for generating rotary movement which starting from a zero position of a drive lever proceeds selectively into one or other drive direction whereby an element to be driven is only then turned when the drive lever is moved away from the zero position whilst the element which is to be driven is not entrained along when the drive lever is moved towards the zero position. The drive lever is able to swivel about a drive axis and is coupled to locking means which can be brought into engagement with teeth arranged around the circumference of a drive wheel. The locking means have a one-piece tilt element which tilts to and fro between two end positions depending on the relevant drive direction and in each end position the tilt element locks with the teeth of the drive wheel.

From DE 195 27 912 A1 a drive acting on both sides is known where a drive lever is mounted on a drive axle and supports swivel coupling elements whose free ends which are provided with toothed elements can be brought into engagement with the teeth arranged around the circumference of a drive wheel. The swivel coupling elements are associated with a slide guide which depending on the swivel direction of the drive lever lifts each relevant unstressed coupling element away from the teeth of the drive wheel. Spring areas are thereby provided on both sides outside of the slide guide and exert on the coupling elements a force directed against the engagement direction of the teeth so that so-called ratchet noises are avoided during movement.

The drives described have a relatively high number of individual parts which are expensive to manufacture and assemble. Similarly in the event of a "tooth to tooth" setting of the coupling element and drive wheel this can lead to jumping across and to jerky movement on the drive lever and during resetting movement of the drive lever so-called ratchet noises can occur.

SUMMARY

Starting from this prior art the object of the invention is to provide a drive acting on both sides to generate a rotary movement which uses a small number of individual parts, is simple to assemble, causes less noise during actuation and which can be coupled in any position and reset.

The solution according to the invention proposes coupling the drive wheel to the drive lever through a combination of at least one positive locking element having at least one associated elastic element. The elastic element can be deformed so that its contour matches the contour of the positive locking element whereby these two elements enter in engagement with each other. Through this positive engagement which can be produced with continuously variable adjustment the teeth of the coupling element are prevented from jumping over each other since a coupling always arises where the positive locking elements enter into engagement with the elastic element.

At the same time the provision of an elastic element, e.g. a volume or rubber elastic element ensures damping of the noises which occur during adjustment.

In one embodiment at least one elastic element is mounted on the drive wheel and positive locking elements are provided on the coupling elements wherein the positive locking elements deform the elastic element when torque is introduced through the coupling elements. This deformation is macroscopically contour-forming namely so that a force- or torque-transferring coupling is produced between the positive locking elements and the elastic element. The contour formation is thereby developed so that a sufficiently load-bearing coupling is produced between the positive locking element and the elastic element so that the drive wheel can be turned. In the region of the coupling between the positive locking elements and the elastic element it is thus possible to transfer forces acting in the circumferential direction of the drive wheel in order to generate rotation. The deformation of the elastic element ensures toothed engagement with the positive locking element so that it is possible to speak of a quasi positive locking connection.

In one embodiment, the positive locking elements are arranged on the drive wheel and the coupling elements are provided with the corresponding elastic elements whereby the end effect is that the same function is fulfilled. Which of the embodiments is better depends on the relevant field of use and the conditions and circumstances involved surrounding the manufacture of the drive.

The elastic elements on the output wheel or on the coupling elements are preferably fixed with positive engagement or material engagement on the drive wheel or on the coupling elements. This cuts down in particular the assembly work. In one embodiment, the elastic elements are made from polyurethane, but other elastic materials can also be provided such as e.g. rubber elastic materials or the material having the trade name "Vulkollan".

In one embodiment, the substantially rigid positive locking elements have the shape of teeth whereby each positive locking element can have one or more teeth. The configuration with only one tooth, or "quasi one pin," projecting into the elastic element has the advantage of lower production costs but does bring the risk that the elastic element would become damaged owing to the deep penetration of the individual tooth. It is therefore proposed as an alternative to attach the positive locking element to several teeth so that the teeth can penetrate into the elastic element by a maximum of their tooth height. Several teeth furthermore have the advantage that the force is transferred evenly over a larger surface area of the elastic element.

In the event where the positive locking elements are mounted on the drive wheel they preferably have the shape of two concentric saw tooth like serrations whereby the steep flanks of each saw tooth like serration are aligned oppositely relative to each other.

In order to achieve a small idling path during the displacement of the drive lever, in a preferred configuration the coupling elements engage with the drive wheel when the drive lever is in the zero position; this means that the rigid positive locking elements and the elastic elements contact one another in the zero position and that in the event of torque transfer the loaded rigid positive locking element is reproduced in the elastic element.

In one embodiment, the coupling elements can be assigned a slide guide which lifts the unstressed coupling elements during movement of the drive lever from the zero position away from the drive wheel and keeps them raised until reaching the zero position once again. In this way, the unstressed coupling elements do not slide over the positive locking elements during the adjusting movement. Similarly, during the resetting movement of the drive lever the drive wheel is not entrained in the sense of the resetting movement.

In one embodiment, spring areas on either side outside of the slide guide areas exert a force against the engagement direction on the loaded coupling elements. The spring force is thereby measured so that when the drive lever is moved from the zero position the loaded coupling element remains in engagement with the drive wheel but during movement towards the zero position is brought out of engagement. During a resetting movement of the drive lever into the zero position, therefore, not one of the coupling elements is coupled with the drive wheel. The unstressed coupling element is brought out of engagement as a result of the slide guide areas and the stressed coupling element is uncoupled from the drive wheel as a result of the spring force of the spring area. During the resetting movement of the drive lever back into the zero position the elastic element and the positive locking elements are not in engagement with each other so that the resetting movement is made easier and the wear, more particularly on the elastic element, is reduced.

In one embodiment, the coupling elements in the zero position are not in contact with the drive wheel. Thus plastic deformation of the elastic element as a result of the permanent contact with the positive locking elements is prevented. A slide guide is associated with the coupling elements and, during movement of a drive lever out of the zero position, it brings the coupling element which is to be loaded into engagement with the drive wheel and ensures that during the opposite movement, thus when the drive lever is moved towards the zero position the unstressed coupling element remains out of engagement with the drive wheel.

In one embodiment, the smallest possible structural space is achieved by forming the slide guide in a cover element of the drive whereby a guide element is mounted on each coupling element and is guided in the corresponding slide guide. Depending on the arrangement of the cover element The guide element can protrude axially or radially from the coupling element whereby the slide guide is designed accordingly.

For a fast precise guide for the coupling elements, the guide elements can have a non-rounded corner section so that the coupling elements are quickly raised and rapidly moved into engagement with the drive wheel.

BRIEF DESCRIPTION OF DRAWINGS

The idea on which the invention is based will now be explained in further detail with reference to the embodiments illustrated in the drawings in which:

FIG. 9a shows a cross-section of the radially resilient coupling elements of FIG. 9.

The same reference numbers in the figures relate to similar component parts. For reasons of clarity not all of the reference numerals are entered in all of the figures.

FIG. 1 shows a drive lever 10 mounted above an axis 1 and on which coupling elements 20a and 20b are formed in one piece. The coupling elements 20a and 20b preferably have a rounded or rectangular cross-section and are made from metal or plastics and enable radial displacement. The coupling elements 20a and 20b are thereby formed on the drive lever 10 so that one end of the coupling element 20a or 20b formed as a coupling area 22a or 22b can be brought into engagement with an elastic element 51 whereby the elastic element 51 is connected rotationally secured to a drive wheel 30.

Figure 1:
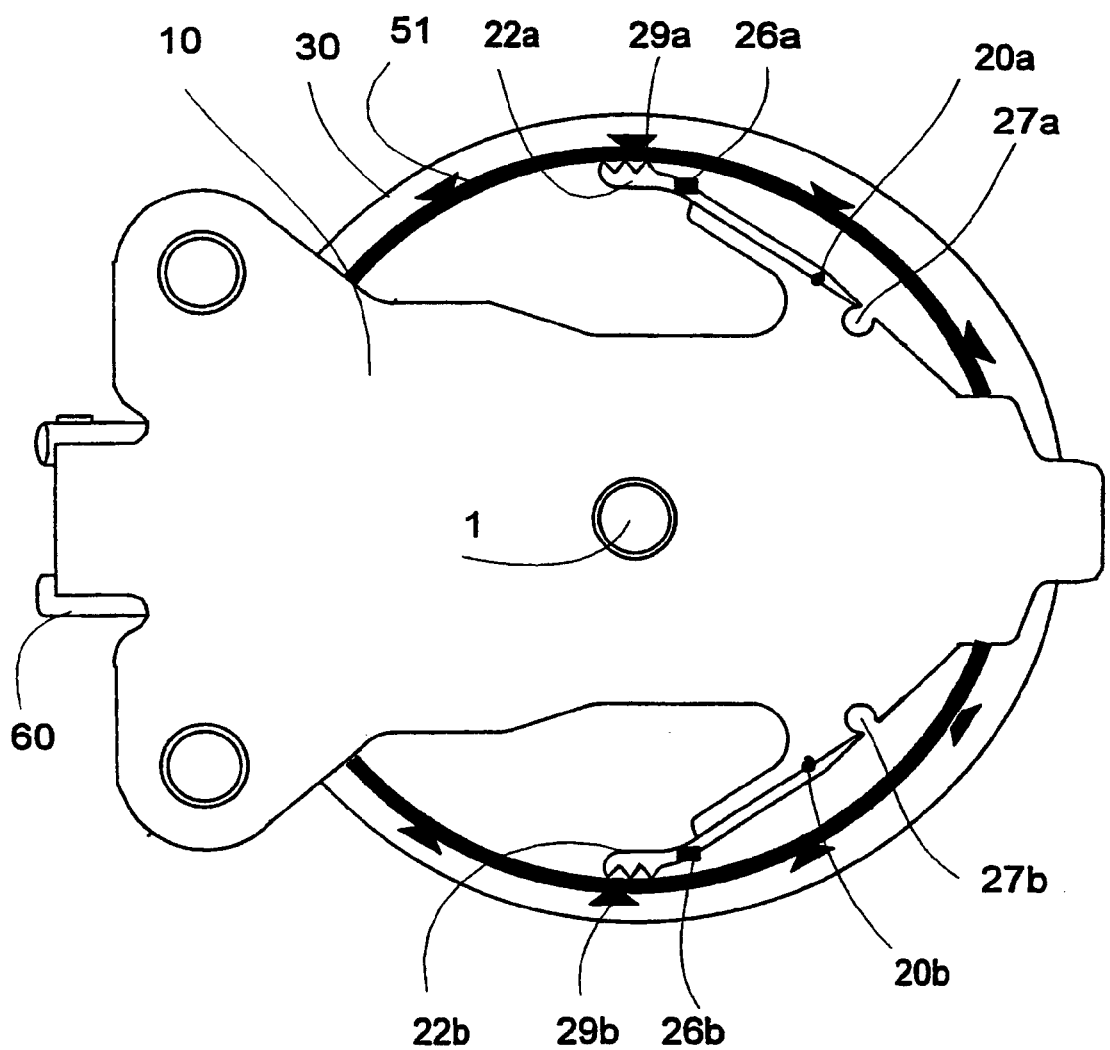
FIG. 1 is a side view of an embodiment of a drive having an elastic element on the drive wheel.

The coupling areas 22a and 22b formed on the coupling elements 20a and 20b have in the direction of the elastic element 51 positive locking elements 29a, 29b which are formed as teeth. Furthermore guide elements 26a and 26b are fixed on the coupling elements 20a and 20b and protrude axially—thus out from the plane of the drawing—to engage in a slide guide (not shown) so that when the drive lever 10 is operated from the illustrated zero position a corresponding radial movement of an unstressed coupling element is generated in the direction of the axis 1. Further details on the method of functioning of the slide guide and guide elements 26a and 26b will be given below. The radial movement of the coupling elements 20a and 20b is made easier through their elastic design. The radial elasticity is enhanced through the recesses 27a and 27b on the shoulder of the coupling elements 20a and 20b on the drive lever 10.

When the drive lever 10 is moved clockwise out from the illustrated zero position the teeth 29b (initially in contact with the surface of the elastic element 51) of the coupling area 22b of the coupling element 20b are pressed into the elastic element 51 and thus automatically form the corresponding toothed area. Through this engagement between the positive locking elements 29b and the elastic element 51 the torque introduced through the drive lever 10 is transferred to the elastic element 51 which in turn as a result of the rotationally secured support of the elastic element 51 by means of the dovetailed guides transfers the torque to the drive wheel 30 and sets this in rotation. The drive wheel 30 is in turn connected to the device to be adjusted, either directly or through gearing or a transmission member.

After the adjustment has been made the drive lever 10 is returned into its starting or zero position by means of a resetting spring 60 which is here only shown as an indication. Various different ways are provided to prevent the drive wheel 30 from being entrained during the resetting movement of the drive lever 10. Apart from a slide guide for the guide elements 26a and 26b which during the adjusting movement lift the correspondingly unloaded coupling elements 20a and 20b from the elastic element 51, it is possible in order to prevent the drive wheel 30 from turning back during the resetting movement of the drive lever 10 into its zero position, to provide a corresponding design of the positive locking elements 29a and 29b. The positive locking elements 29a and 29b are thereby shaped with a saw-tooth structure so that the steep flanks are arranged in the direction of the adjusting movement and the backs of the steep flanks are formed correspondingly flat so that sliding back onto the elastic element 51 is readily possible. An alternative form for guiding the coupling areas will be explained later on with reference to FIGS. 5 and 5a.

Figure 2:
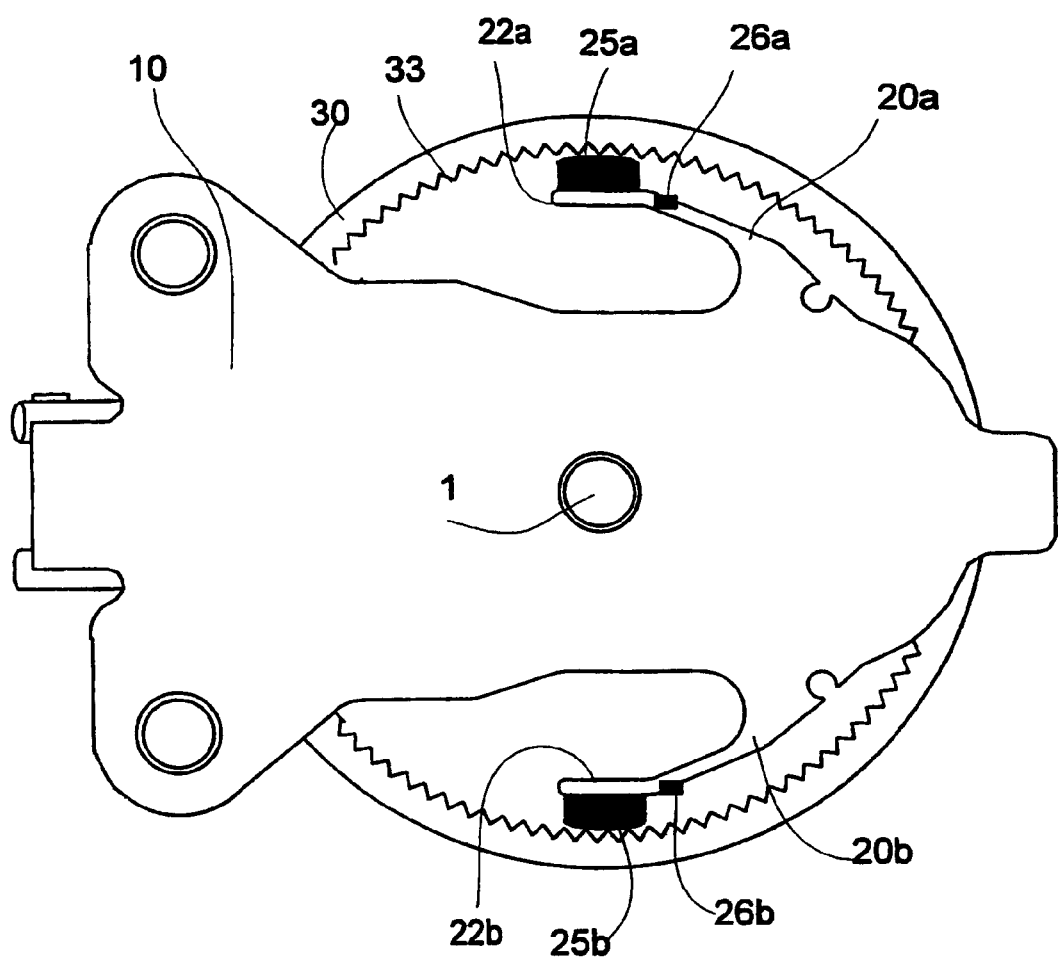
FIG. 2 is a side view of an embodiment of a drive with elastic elements on the coupling elements.

FIG. 2 shows a drive which corresponds substantially to the construction of the drive according to FIG. 1. At the end areas of the shaped coupling elements 20a and 20b there are instead of the positive locking elements according to FIG. 1 elastic elements 25a and 25b which are either stuck on or fixed in a different way or which if the drive lever 10 is suitably formed of plastics are moulded integral therewith. With an integral design of the drive lever 10 and elastic elements 25a and 25b it is proposed in order to match up the materials in optimum manner to use different materials which are joined together for example in the twin-component injection moulding process.

Correspondingly, internal teeth 33 are provided on the inner circumference of the drive wheel 30 which is formed as a hollow wheel to set up the corresponding positive locking elements. Similar to the drive according to FIG. 1 guide elements 26a and 26b are also provided here to engender the corresponding radial movement of the end of the coupling elements 20a or 20b and thus also the movement of the elastic elements 25a and 25b respectively.

The internal teeth 33 can be made for example from two saw tooth like serrations arranged axially behind each other with their steep flanks aligned opposite the adjustment direction so that during the resetting movement of the drive lever 10 the relevant elastic elements slide along on the flat backs of the teeth without the drive wheel 30 being moved. The coupling element which is not loaded each time during the adjustment movement is lifted over the slide guide. As an alternative to the special configuration of the internal teeth 33 springs can be provided which after the adjustment movement has taken place force the driving coupling element radially inwards and bring about the separation of the elastic element from the internal teeth 33.

In the embodiments according to FIGS. 1 and 2 it is basically possible for the coupling elements 20a, 20b in the zero position of the drive lever 10 to be either in engagement or out of engagement with the drive wheel 30.

Depending on the starting position the corresponding slide guides are to be selected so that an engagement or disengagement of the relevant coupling elements takes place accordingly.

Figure 3:
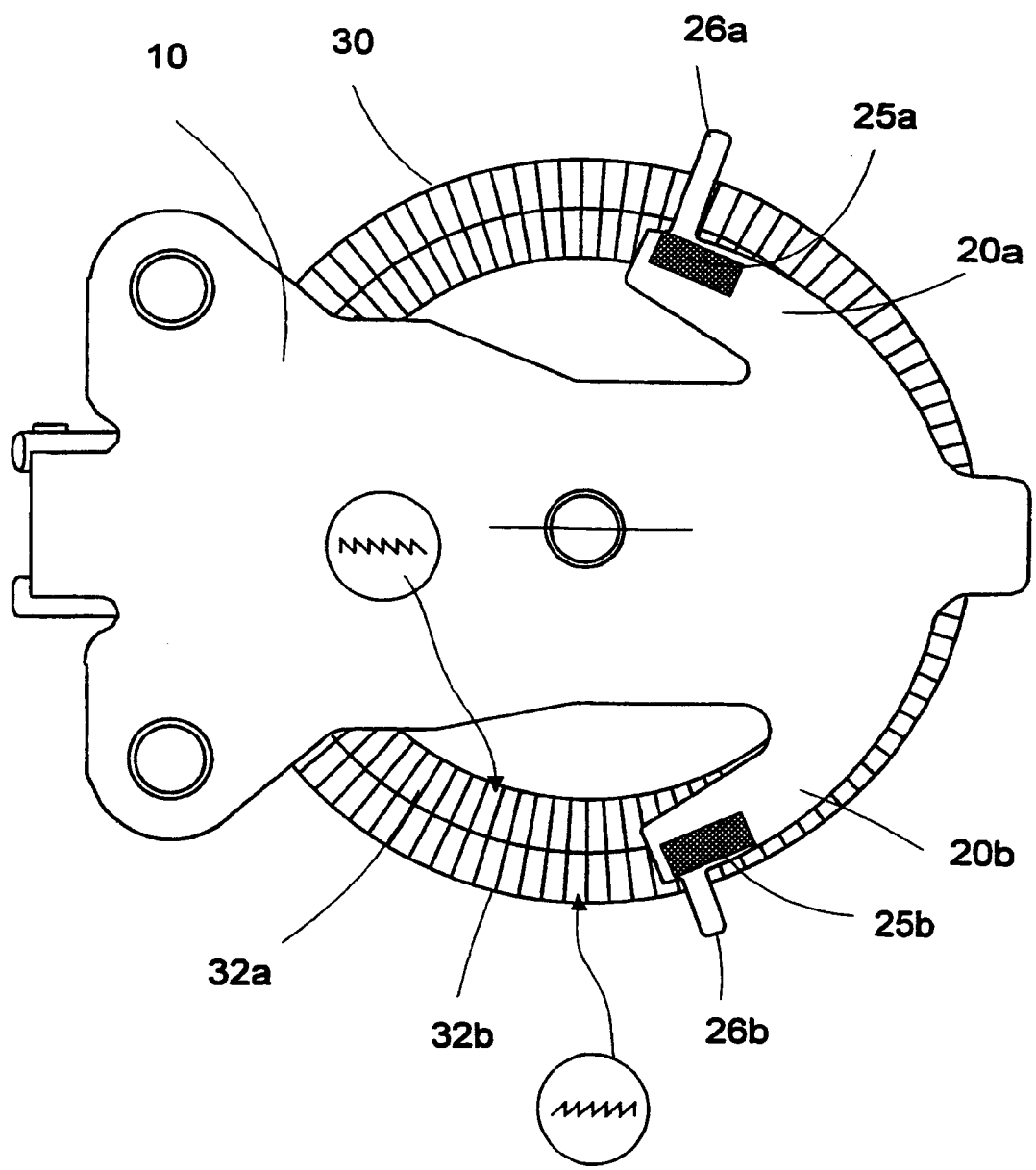
FIG. 3 is a side view of an embodiment of a drive with two concentric spur gears around the drive wheel.

Apart from the radially resilient suspension of the coupling elements 20a and 20b in an alternative according to FIG. 3 the shaped coupling elements 20a and 20b are axially resilient whereby a particularly flat structural space for the entire drive is achieved. Thus the drive wheel 30 of the drive is connected to two concentric serrations 32a, 32b which are preferably designed with a saw tooth shape. The teeth 32a and 32b are thereby aligned oppositely relative to each other which means that the steep sides of the saw tooth teeth are each opposite the corresponding elastic element 25a and 25b and there is an active coupling of the drive wheel 30 with the drive lever 10. The alignment of the teeth 32a and 32b is indicated in the enlarged detailed illustrations.

The guide elements 26a and 26b which are likewise formed integral on the drive lever 10 are formed as tabs and are guided in a slide guide (not shown) which either bring the end areas of the coupling elements 20a and 20b into engagement with the teeth 32a and 32b or lift them out of engagement, depending on whether the coupling elements 20a and 20b had been out of engagement or in engagement.

Figure 4:
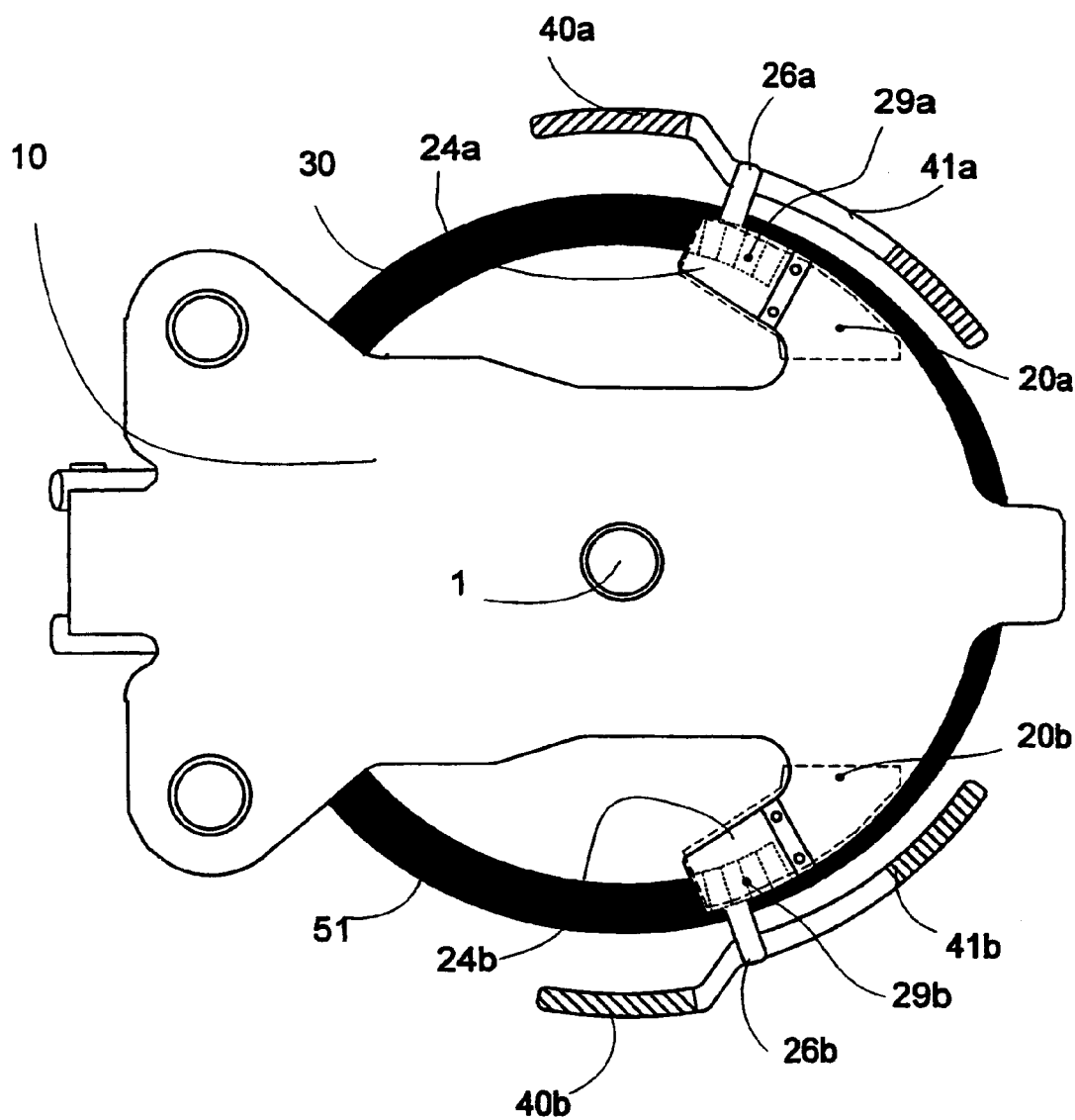
FIG. 4 is a side view of an embodiment of a drive with moulded coupling elements and a drive wheel with end teeth.

In FIG. 4 separate coupling areas 24a and 24b are fixed by rivets on the coupling elements 20a and 20b formed on the drive lever 10; alternatively fixing can be achieved by the conventional methods of connection such as screws, sticking or positive locking by insertion into a corresponding guide. The coupling areas are axially active as in the drive according to FIG. 3 and engage in an elastic element 51 of the drive wheel 30. Corresponding positive locking elements 29a, 29b are attached to the coupling areas 24a and 24b and for reasons of clarity are shown only by dotted lines.

Similarly the separate coupling areas 24a and 24b have guide elements 26a and 26b which project radially outwards and are guided in a slide guide 40a and 40b. In the illustrated embodiment the positive locking elements 29a, 29b are not in engagement with the elastic element 51 when the drive lever 10 is located in its zero position. If the drive lever 10 is turned clockwise the guide element 20b runs from the ramp-like contour of the slide guide 40b and is forced axially towards the drive wheel 30 owing to the resilient design of the holder of the coupling area 24b which can be formed as a spring plate. An automatic guide is also conceivable inside the slide guide so that no spring pretension is required.

The guide element 26a on the other hand runs along on the slide guide area 41a and over the entire adjustment area holds the positive locking elements 29a out of engagement with the drive wheel 30. During the resetting movement of the drive lever 10 into its zero position the guide element 26a slides back on the slide guide area 41a into the illustrated position without producing any engagement with the drive wheel 30.

As a result of the configuration of the positive locking elements 29b of the coupling area 24b, preferably as saw teeth with the corresponding alignment or through an inclined pin, the coupling area 24b slides back on the elastic element 51 of the drive wheel 30 until it runs up onto the ramp like protrusion of the slide guide 40b where it is axially lifted up. In the zero position of the drive lever 10 the two guide elements 26a and 26b are located on the level of the slide guide area 41b and the positive locking elements 29a and 29b are correspondingly out of engagement.

In one embodiment, the positive locking elements are held in the zero position in engagement with the elastic element 51 and when introducing the adjusting the unstressed positive locking element is lifted over the slide guide.

In one embodiment, the coupling areas 24a and are axially prestressed in other ways than through a spring plate. For example, prestressing can be accomplished through a separate spring and a corresponding articulated bearing of the coupling areas 24a and 24b on the drive lever 10.

Figure 5:
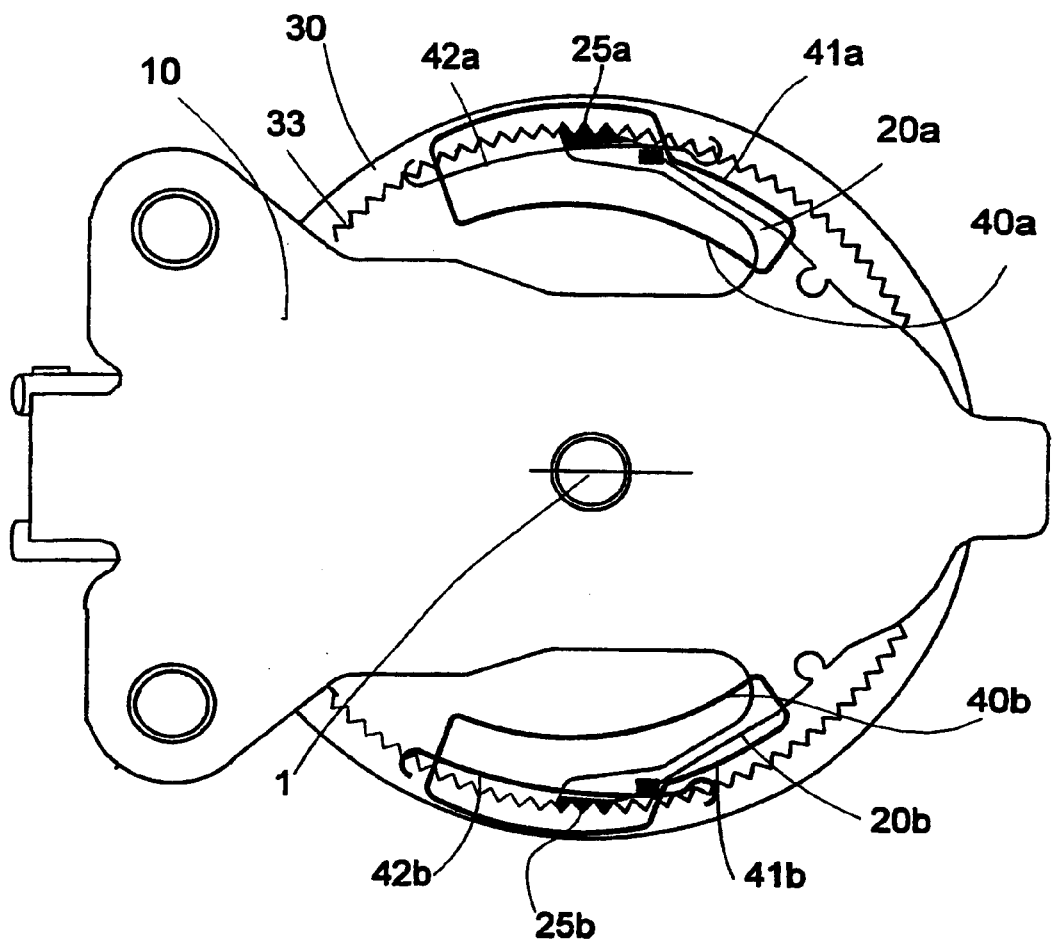
FIG. 5 is a side view of an embodiment of a drive with moulded coupling elements and an internally toothed drive wheel as well as slide guides and spring areas.
Figure 5A:
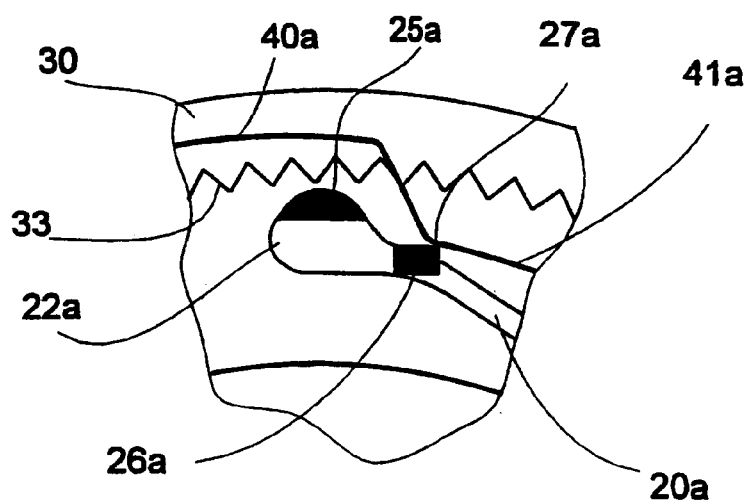
FIG. 5a is a detail view of a slide guide with an uncoupled coupling element according to one embodiment.

FIGS. 5 and 5a show a variation of the invention with shaped coupling elements 20a and 20b to which axially protruding guide elements 26a and 26b are attached. The guide elements 26a and 26b each project into a slide guide 40a and 40b which is preferably mounted in a housing cover which for reasons of clarity has not been shown. Likewise the guide elements 26a and 26b are located in the zero position in contact with a leaf spring 42a and 42b wherein the springs 42a and 42b are arranged so that in the zero position of the drive lever 10 the elastic elements 25a, 25b engage with the internal teeth 33 as a result of the spring force of the coupling elements 20a and 20b which act in the direction of the integral teeth 33.

As the drive lever 10 moves in the clockwise direction the drive wheel 30 is turned in the clockwise direction through the elastic element 25b of the coupling element 20. At the same time the elastic element 25a is moved radially in the direction of the axis 1 and brought out of engagement with the internal teeth 33 as a result of the guide element 26a sliding along on the slide guide 40a. This process can be clearly seen in FIG. 5a.

The guide element 26a slides with the non-rounded corner region 27a along on the ramp-like path of the slide guide 40a until the slide guide area 41a has been reached. The coupling element 20a is thereby bent elastically in the direction of the axis 1 and the coupling region 22a with the elastic element 25a fixed thereon is brought out of engagement with the internal teeth 33.

The elastic element 25a thereby assumes its original contour, this means that despite the engagement of the elastic element 25a with the internal teeth 33 no plastic deformation takes place. In one embodiment, with the further turning movement of the drive lever 10 the guide element 26a slides along on the slide guide region 41a which is thus formed so that the elastic element 25a cannot enter into engagement with the internal teeth 33.

At the end of the adjusting movement and after return of the drive lever to its zero position the coupling element 20a again occupies the original position shown in FIG. 5.

In order not to entrain the drive wheel 30 during the resetting movement of the drive lever 10 into its zero position after the adjustment process, the spring 42b which is designed and arranged accordingly, presses in the direction of the axis whereby the coupling element 20b which is now not loaded is brought together with the elastic element 25b out of engagement with the internal teeth 33. In this way the drive wheel 30 is prevented from turning anti-clockwise during the resetting movement.

Figure 6:
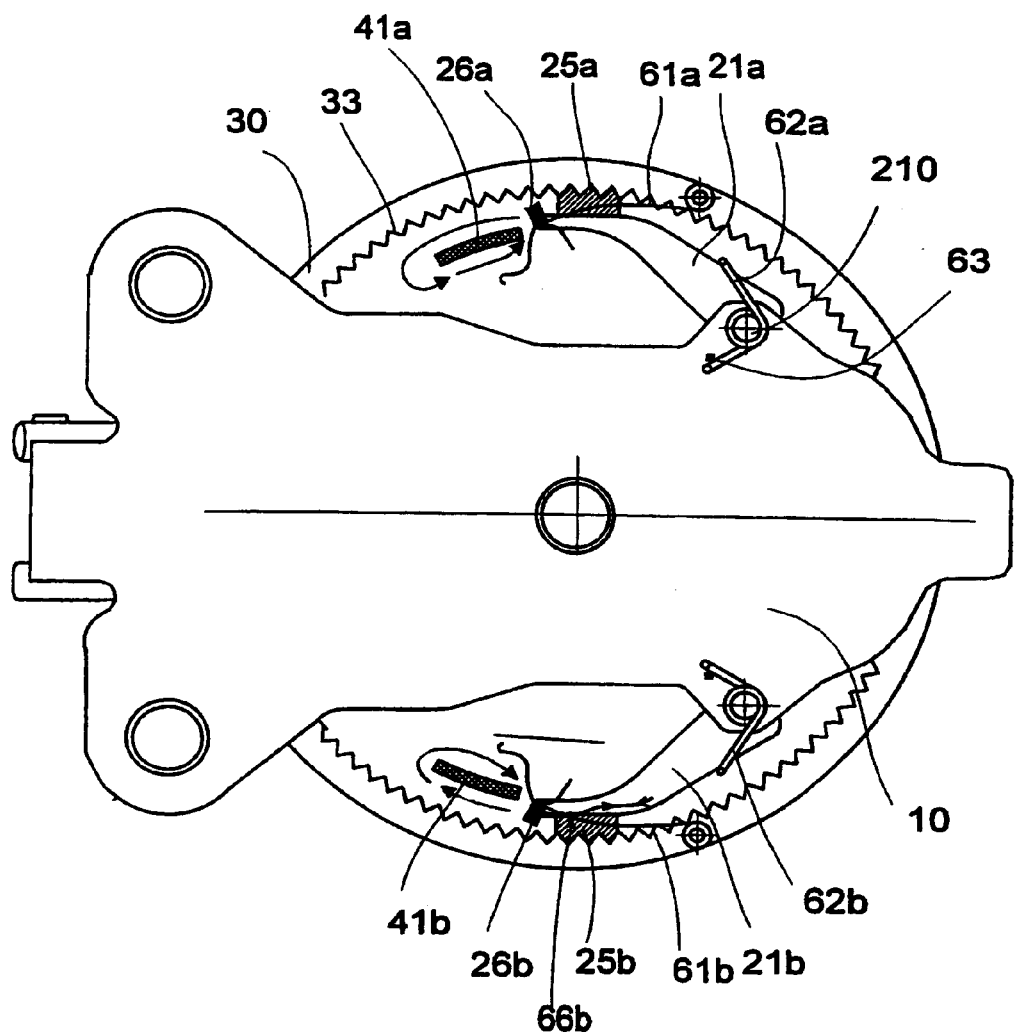
FIG. 6 is a side view of an embodiment of a drive with coupling elements mounted for articulation.

FIG. 6 shows an embodiment in which a separate coupling element 21a is mounted on the drive lever 10 to swivel about an axis 210. A leg spring 62a which is supported on a stop 63 which is fixed on the drive lever 10 exerts on the separate coupling element 21a a spring force which moves the elastic element 25a which is attached to the front end of the coupling element 21a radially inwards, thus away from the internal teeth 33 of the drive wheel 30. A spring element 61 which is mounted fixed on the housing acts against this spring force of the spring 62a and acts on the guide element 26a so that the elastic element 25a in the illustrated zero position of the drive lever 10 is held in engagement with the internal teeth 33 of the drive wheel 30.

The spring element 61a is preferably mounted in a cover (not shown) and is located above the plane of the drawing. A slide guide area 41a likewise mounted rotationally secured in a cover or housing is located at the same height. During rotary movement in an anti clockwise direction the guide element 26a slides along on the spring element 61a and owing to the shaping of the spring element 61a reduces the spring force which acts outwards. The elastic element 25a consequently strives to move inwards as a result of the force applied by the spring 62a. This radially inwardly directed movement is prevented through the slide guide element 41a which is arranged so that the guide element 26a always stops at a predetermined distance from the internal teeth 33 and the elastic element 25a is thereby held in engagement with the internal teeth 33. For reasons of clarity the distance between the slide guide area 41a and the spring element 61a is shown on an enlarged scale.

At the end of the slide guide region 41a the coupling element 21a snaps radially inwards since now only the spring force of the spring 62a is effective and the elastic element 25a is brought out of engagement with the internal teeth 33 after the drive wheel 30 has been turned about the corresponding angle. During a resetting movement there is thus no coupling between the drive lever 10 and the drive wheel 30 and the drive wheel 30 is thus not turned back. The path of the guide element 26a is shown by the arrows.

Figure 6A:
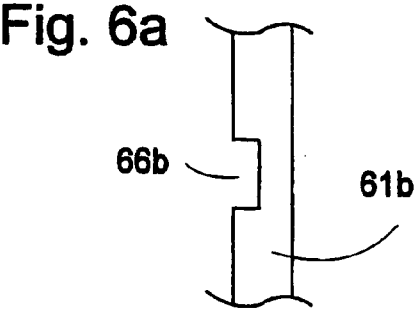
FIG. 6a shows a detail of the spring element and recess of FIG. 6.

On the opposite side the coupling element 21b is moved accordingly so that here the guide element 26b initially remains in engagement with the internal teeth 33 as a result of the spring element 61b. In the spring element 61b there is a through opening or suitably formed recess 66b (shown in more detail in FIG. 6a) through which the guide element 26b can slide so that no more force is introduced through the spring element 61b. After the collapse of the spring force only the inwardly directed spring force of the spring 62b is effective so that after a certain adjustment path the elastic element 25b is brought out of engagement with the internal teeth 33 and during the resetting movement is not in engagement. The corresponding guide curve for the guide element 26b is indicated by the arrow. A corresponding recess is also formed in the spring element 61a but is not drawn separately here.

Figure 7:
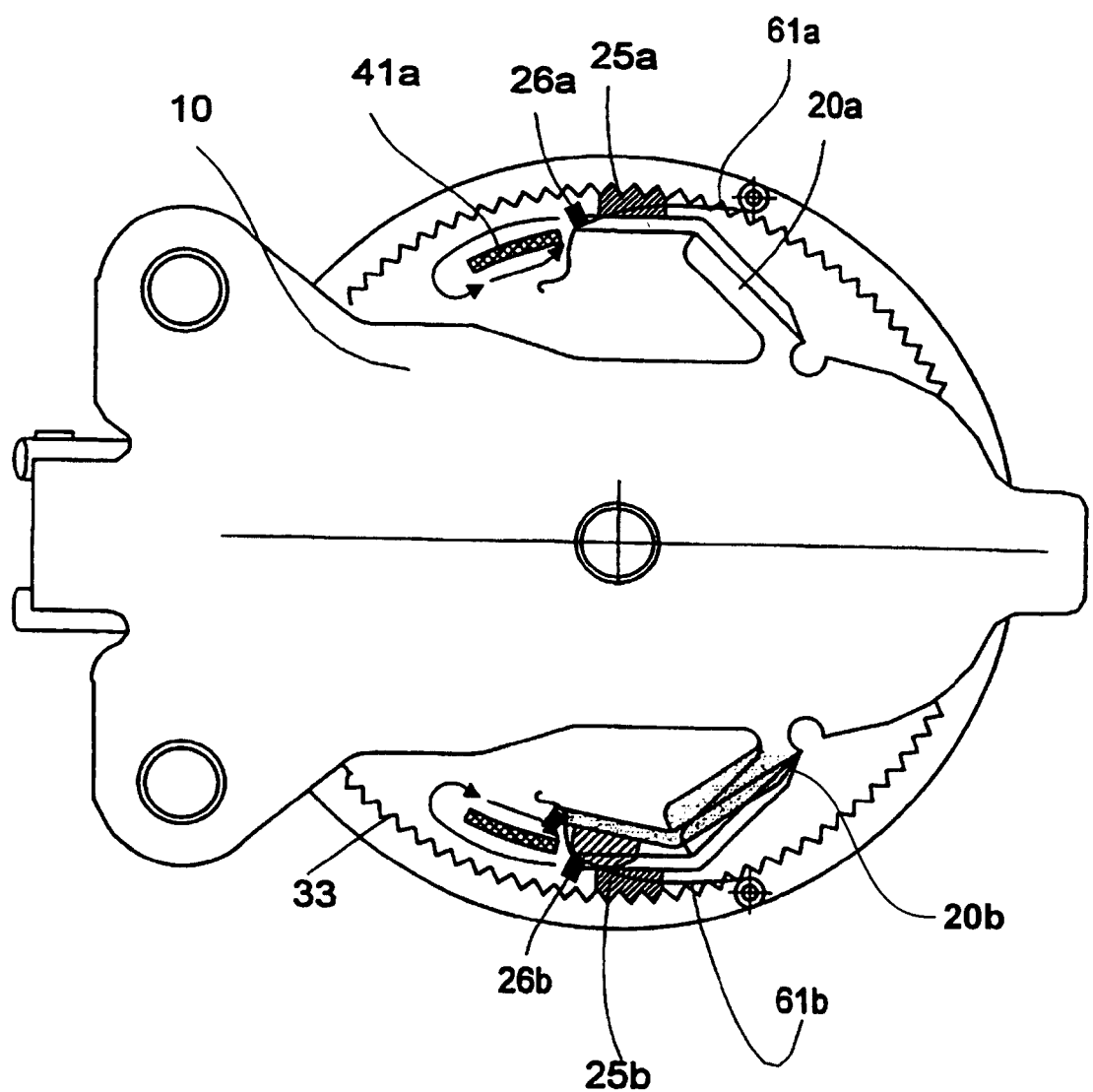
FIG. 7 shows a drive with automatically guided coupling elements.

FIG. 7 shows a drive which as regards function corresponds to that of FIG. 6 but instead of the separate coupling elements fixed for articulation has integral coupling elements 20a and 20b. The coupling elements 20a and 20b are thereby designed so that in their normal position they keep the elastic elements 25a and 25b out of engagement with the internal teeth 33. The spring elements 61a and 61b however through the guide element 26a press the coupling elements 20a and 20b and thus also the elastic elements 25a and 25b radially outwards and bring these into engagement with the internal teeth 33. The original position of the coupling element 20b is shown in dotted lines in the lower half of the drawing. Such a position would exist if the spring element 61b were not acting on the guide element 26b. In this position it can also be clearly seen that the elastic element 25b returns to its original contour as soon as it is out of engagement with the internal teeth 33.

Figure 8:
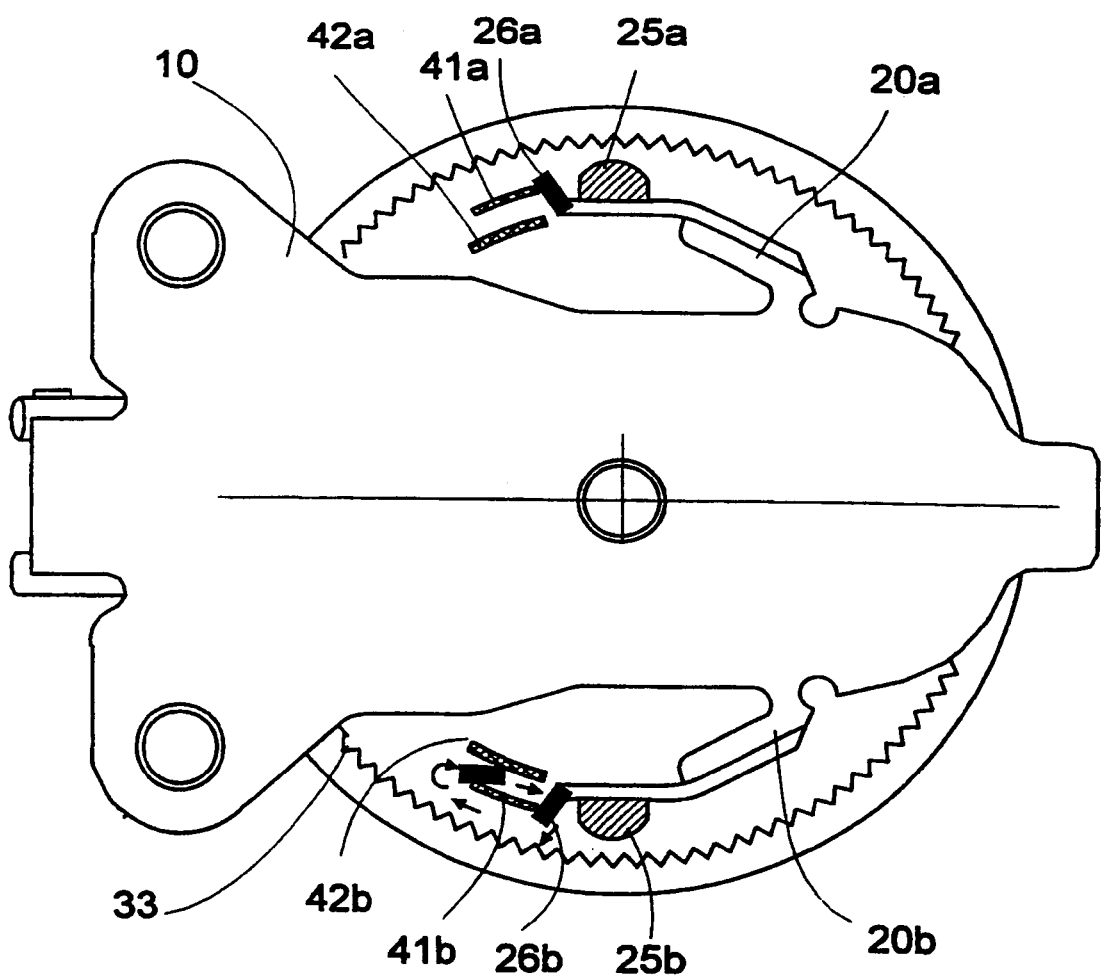
FIG. 8 is a side view of an embodiment of a drive with spring-loaded moulded coupling elements.

FIG. 8 shows a further variation of the drive wherein the coupling elements 20a and 20b are formed on the drive lever 10 similar to that shown in FIG. 7. Both elastic elements 25a and 25b are located in the illustrated zero position of the drive lever 10 out of engagement with the internal teeth 33 and are only forced radially outwards and brought into engagement with the internal teeth 33 during a corresponding adjustment movement through the inclined guide elements 26a and 26b and the slide guide element 41a, 41b.

If the drive lever 10 is turned clockwise then the guide element 26b which is set inclined to the slide guide element 41b slides radially outwards according to the arrow and brings the elastic element 25b into engagement with the internal teeth 33. As soon as the guide element 26b has reached the end of the slide guide area 41b which is fixed on the housing it snaps as a result of the elastic design of the coupling element 20b radially inwards so that the guide element 26b stops against a parallel aligned slide guide region 42b which is spaced from the slide guide region 41b.

During the resetting movement of the drive lever 10 back to the zero position the guide element 26b is turned slightly and guided between the slide guide regions 41b and 42b in a slight clamping seat so that rattling is prevented. This turning of the guide element 26b is made possible by a corresponding elastic design or mounting. The slide guide regions 41b and 42b are preferably mounted rotationally secured in a cover and the guide element 26b advantageously projects out from the plane of the drive wheel 30 so that there is a greater freedom when arranging the slide guide regions 41b and 42b.

As an alternative to the embodiment illustrated in FIG. 8 it is possible and proposed to dispense with the second slide guide region 42b and to prevent rattling of the guide element 26b through a suitable arrangement of the slide guide region 41b in that during the return movement the guide element 26b is forced outwards against the slide guide region 41b as a result of the radially outwardly acting force. This can be achieved for example in that the slide guide region 41b is mounted in the centre of the guide element 26b so that displacement takes place both radially outwards and radially inwards, depending on the direction of movement. The elastic design of the coupling element ensures the necessary pretension.

The elastic element which is not in engagement with the internal teeth remains out of engagement during the entire displacement movement and no separate mechanism need be provided to prevent the drive wheel 30 from turning back during the resetting movement.

The advantage of the embodiments according to FIGS. 6 to 8 lies in the fact that no corresponding saw tooth internal teeth 33 have to be provided but that a normal internally toothed area 33 is sufficient since the elastic elements 25a and 25b are always out of engagement with the internal teeth 33 during the resetting movement of the drive lever 10. The manufacture of the internal teeth 33 is thereby made easier and the wear on the elastic elements 25a and 25b is reduced.

Figure 9:
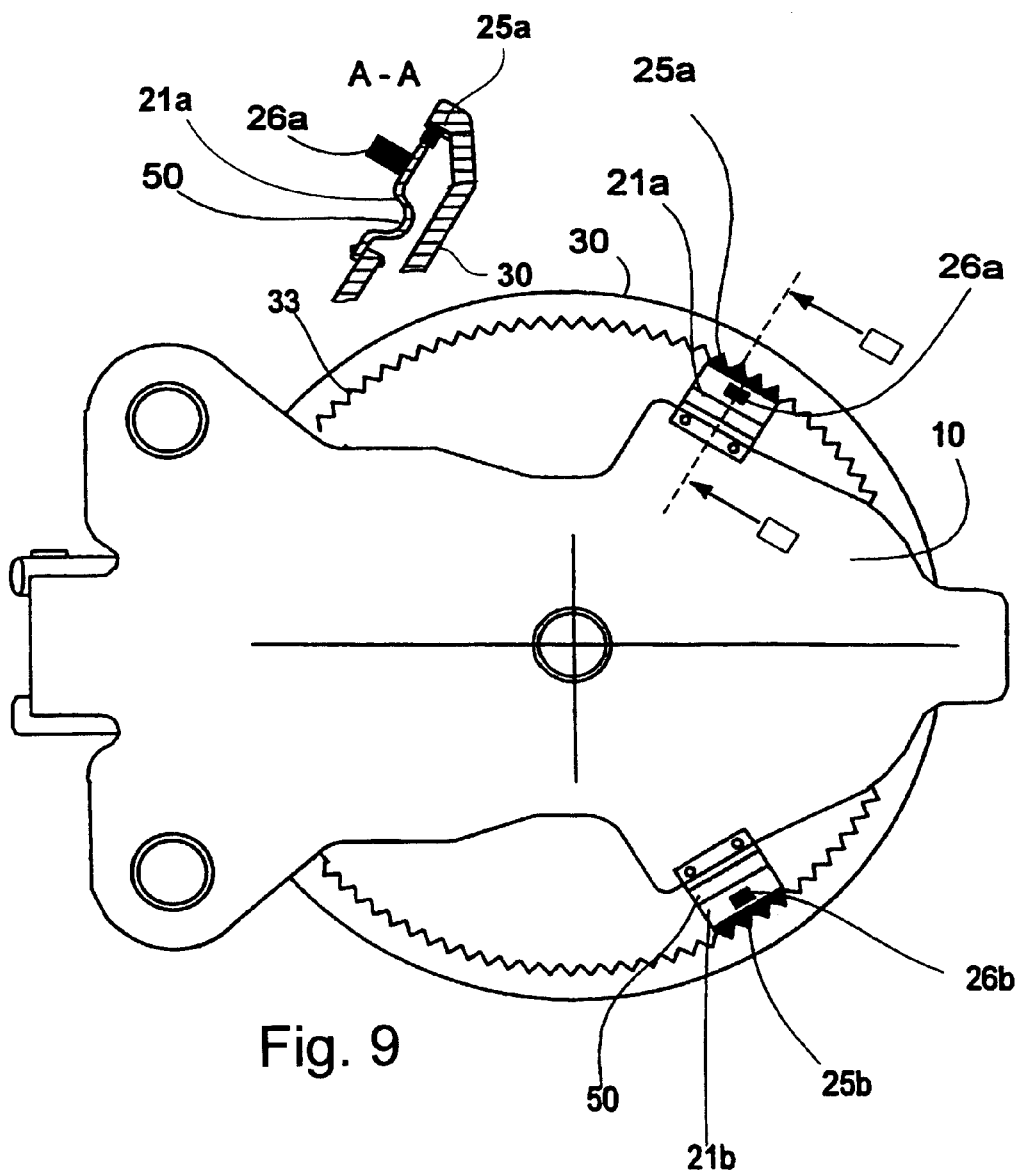
FIG. 9 is a side view of an embodiment of a drive with radially resilient coupling elements.

FIGS. 9 and 9a show a further variation of the drive in which the coupling elements 21a and 21b riveted on the drive lever 10 are formed radially resilient as a result of a swage 50 whereby the stability of the coupling elements 21a and 21b in the direction of rotation can be increased. Similarly a linear inwardly directed movement is possible to bring the coupling elements 21a and 21b as well as the elastic elements 25a and 25b respectively out of engagement with the internal teeth 33. The displacement of the coupling elements 21a and 21b is carried out through a slide guide (not shown) in conjunction with the elastic design through the swage 50 whereby also here there are alternatives to keep the elastic elements 25a and 25b in the zero position of the drive lever 10 in or out of engagement with the internal teeth 33. Preventing the drive wheel 30 from turning along during the resetting movement of the drive lever 10 is achieved either through a corresponding shaping of the internal teeth or by providing means for lifting up the corresponding coupling element, as described in respect of the previous embodiments.

In one embodiment (not shown) with radially displaceable coupling elements there is the possibility of axially dividing the internal teeth of the drive wheel and providing a sawtooth like serration whose steep flanks are aligned opposite one another. An arrangement of this kind corresponds in terms of operation to that of FIG. 3; however instead of the axially active coupling elements radially active coupling elements are provided and instead of concentric spur gearing there are axially off-set internal teeth.

Figure 10:
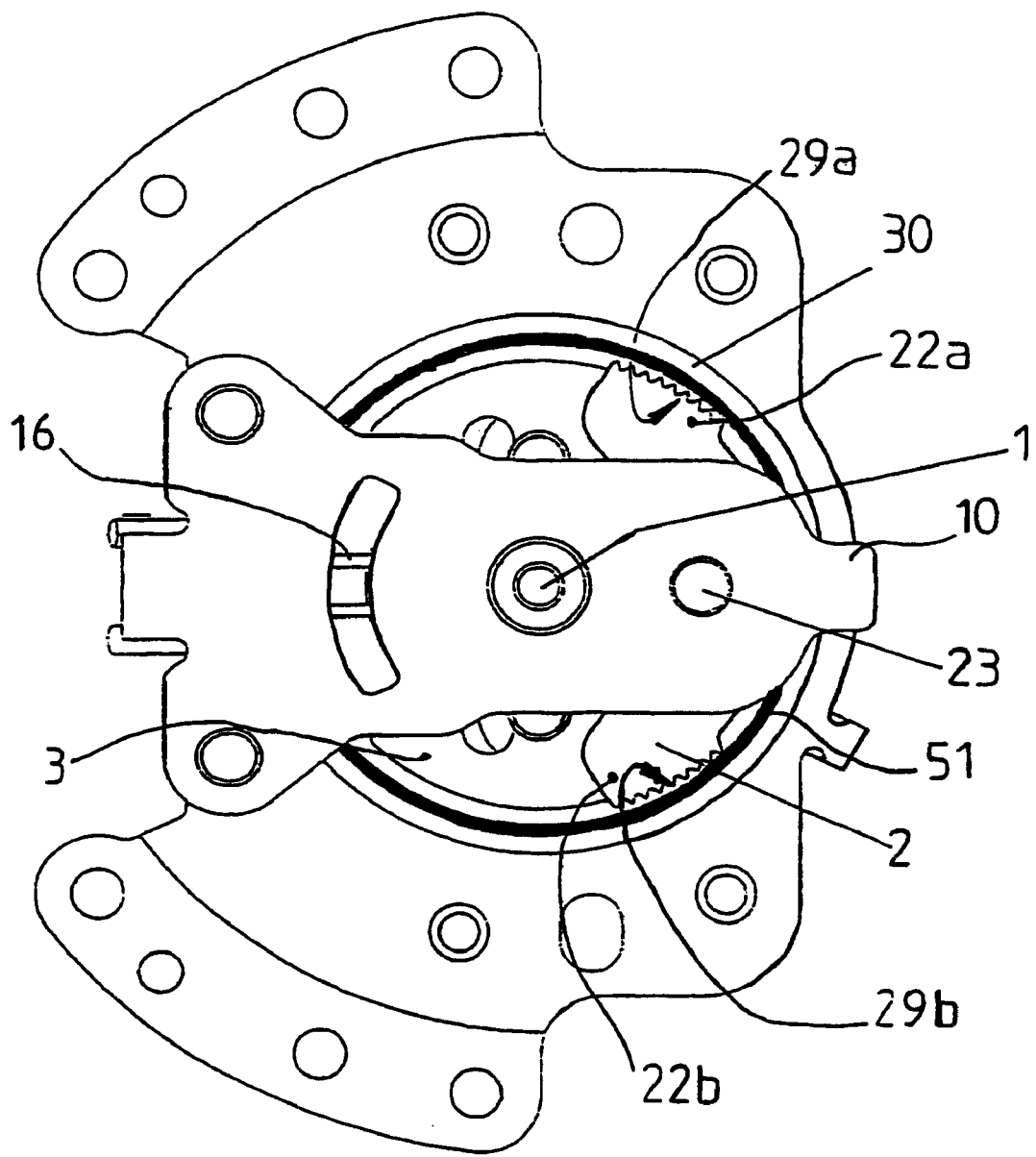
FIG. 10 is a side view of an embodiment of a drive with a coupling element formed as a rocker arm.

FIG. 10 shows a variation of the drive with an integral coupling element 2, cf. here DE 197 25 899 A1. The drive lever 10, the coupling element 2 and the drive wheel 30 with the elastic element 51 attached thereto are mounted on the drive axis 1.

The coupling element 2 designed as a rocker arm has two symmetrically arranged coupling regions 22a and 22b lying on a circle circumference whereby depending on the drive direction one of the coupling regions 22a, 22b can be coupled through the positive locking elements 29a or 29b respectively to the elastic element 51 of the drive wheel 30. Two bearing points spaced radially relative to the drive axis 1 are mounted on the axis of symmetry of the coupling element 2 through which the coupling element 2 is connected on the one hand to the drive lever 10 and on the other to a holding plate 3. The bearing point between the coupling element 2 and the drive lever 10 is thereby provided by a pin or stud 23 which engages in a corresponding recess in the drive lever 10. In a similar way the bearing point between the holding plate 3 and coupling element 2 is formed by a pin or stud (not shown) of the holding plate 3 which engages in a hole of the coupling element 2.

The coupling element 2 is preferably formed as a sintered part wherein the pin 23 is pressed into the sintered part. The holding plate 3 on the other hand is preferably made of plastics to keep down the weight of the drive whereby the pin is moulded for example integral on the holding plate 3. As an alternative the rocker arm can also be made from plastics.

During swivel movement of the drive lever 10 away from the zero position the pin 23 of the coupling element 2 mounted in the drive lever 10 is likewise swivelled about the drive axis 1. As a result of the frictional forces between the holding plate 3 and the drive axis 1 as well as where applicable the drive wheel 30, the holding plate 3 initially opposes any co-rotation with the drive lever 10. The pin of the holding plate 3 thereby forms a counter bearing so that torque arises on the coupling element 2 which tilts the coupling element 2 and engages in the elastic element 51 of the drive wheel 30 depending on the drive direction of one of the coupling regions 22a, 22b.

When the drive lever 10 swivels up out of the zero position the coupling element 2 for example tilts left so that the coupling region 22a is coupled to the elastic element 51 of the drive wheel 30. In this way rotational movement of the drive lever 10 is transferred to the drive wheel 30.

When the drive lever 10 swivels back into the zero position the torque bearing on the coupling element 2 is cancelled so that the coupling region 22a of the coupling element 2 in engagement moves out of engagement and the drive lever 10, coupling element 2 and holding plate 3 return back to the zero position without this resetting movement being transferred to the drive wheel 30.

Furthermore a rotational spring 16 (only shown by way of indication) ensures that the holding plate 3 during the return swivel movement of the drive lever 10 back into the zero position also returns specifically and with slight play into the zero position so that during renewed actuation of the drive lever 10 the coupling element 2 immediately tilts again and further rotational movement is transferred to the drive wheel 30 with minimum idling action.

What is claimed is:

1. A drive acting on both sides for adjusting devices, comprising:
   a rotatable drive wheel;
   a drive lever mounted to swivel starting from a zero position to generate rotary movement of the drive wheel wherein the rotary movement can proceed selectively into one or other direction of rotation; and
   at least one coupling element is mounted on the drive lever to transfer torque to the drive wheel when the drive lever is moved out of the zero position,
   wherein the at least one coupling element is coupleable to the drive wheel through at least one positive locking element and at least one associated elastic element by producing a positive locking coupling of the at least one positive locking element and the at least one associated elastic element.

2. The drive according to claim 1 wherein the at least one elastic element is fixed on one of the group consisting of the drive wheel and the at least one coupling element, through at least one of a positive locking connection and a material bonding connection.

3. The drive according to claim 1 wherein the at least one elastic element is made from at least one of the group of materials consisting of polyurethane, volume elastic, and rubber elastic.

4. The drive according to claim 1 wherein the at least one positive locking element has a shape of teeth.

5. The drive according to claim 1 wherein the at least one coupling element in the zero position of the drive lever is in engagement with the drive wheel.

6. The drive according to claim 5 wherein the at least one coupling element is assigned a slide guide which lifts at least one coupling element that is unstressed during movement of the drive lever out from the zero position of the drive wheel and keeps the at least one coupling element that is unstressed raised until the zero position is reached once more.

7. The drive according to claim 6 wherein at least one spring region is provided on each side outside of a slide guide region and the at least one spring region exerts on the stressed at least one coupling element a force directed opposite a direction of engagement whereby the force is measured so that the at least one coupling element which is loaded during movement of the drive lever out of the zero position remains in engagement with the drive wheel whilst the at least one coupling element is brought out of engagement in the unstressed state during movement towards the zero position.

8. The drive according to claim 6 wherein a guide element is mounted on each of the at least one coupling element and is guided in the slide guide.

9. The drive according to claim 1 wherein the at least one coupling element does not contact the drive wheel in the zero position.

10. The drive according to claim 9 wherein the at least one coupling element is associated with at least one slide guide which during movement of the drive lever from the zero position brings a coupling element, which is to be loaded, into engagement with the drive wheel, and during movement in the opposite direction brings a coupling element which is then unloaded out of engagement.

11. The drive according to one of claims 6 and 9 wherein the slide guide is formed in a cover element of the drive.

12. The drive according to claim 1 wherein the at least one coupling element is formed as at least one of integral with and rigidly connected to the drive lever and is formed at least one of axially spring-elastic and radially spring-elastic.

13. The drive according to claim 1 wherein the at least one coupling element is formed separate and at least one associated coupling region is connected to the drive lever for at least one of rotary movement and swivel movement.

14. The drive according to claim 1 wherein the at least one coupling element is loaded at least one of axially and radially by means of at least one spring.

15. A drive acting on both sides for adjusting devices, comprising:
   a rotatable drive wheel;
   a drive lever mounted to swivel starting from a zero position to generate rotary movement of the drive wheel wherein the rotary movement can proceed selectively into one or other direction of rotation; and
   at least one coupling element is mounted on the drive lever to transfer torque to the drive wheel when the drive lever is moved out of the zero position,
   wherein the at least one coupling element is coupleable to the drive wheel through at least one positive locking element and at least one associated elastic element,
   wherein the at least one elastic element is mounted on the drive wheel and the at least one positive locking element is mounted on the at least one coupling element and when torque is introduced through the at least one coupling element the at least one positive locking element deforms the at least one elastic element forming a contour so that a positive locking coupling is produced between the at least one positive locking element and the elastic element in order to turn the drive wheel.

16. A drive acting on both sides for adjusting devices, comprising:
   a rotatable drive wheel;
   a drive lever mounted to swivel starting from a zero position to generate rotary movement of the drive wheel wherein the rotary movement can proceed selectively into one or other direction of rotation; and
   at least one coupling element is mounted on the drive lever to transfer torque to the drive wheel when the drive lever is moved out of the zero position,
   wherein the at least one coupling element is coupleable to the drive wheel through at least one positive locking element and at least one associated elastic element,
   wherein the at least one positive locking element is mounted on the drive wheel and the at least one elastic element is mounted on the at least one coupling element and when torque is introduced through the at least one coupling element the at least one positive locking element deforms the at least one elastic element forming a contour so that a positive locking coupling is produced between the at least one positive locking element and the at least one elastic element in order to turn the drive wheel.

17. The drive according to claim 16 wherein the drive wheel is provided with two concentric saw tooth serrations with oppositely aligned steep flanks.

* * * * *